Aug. 20, 1968     M. A. JAMEY ETAL     3,397,951
PROCESS FOR THE PREPARATION OF CRYSTALLIZED NEUTRAL
ALUMINUM SULPHATES HAVING LOW WATER CONTENT
Filed June 21, 1965                     2 Sheets-Sheet 1
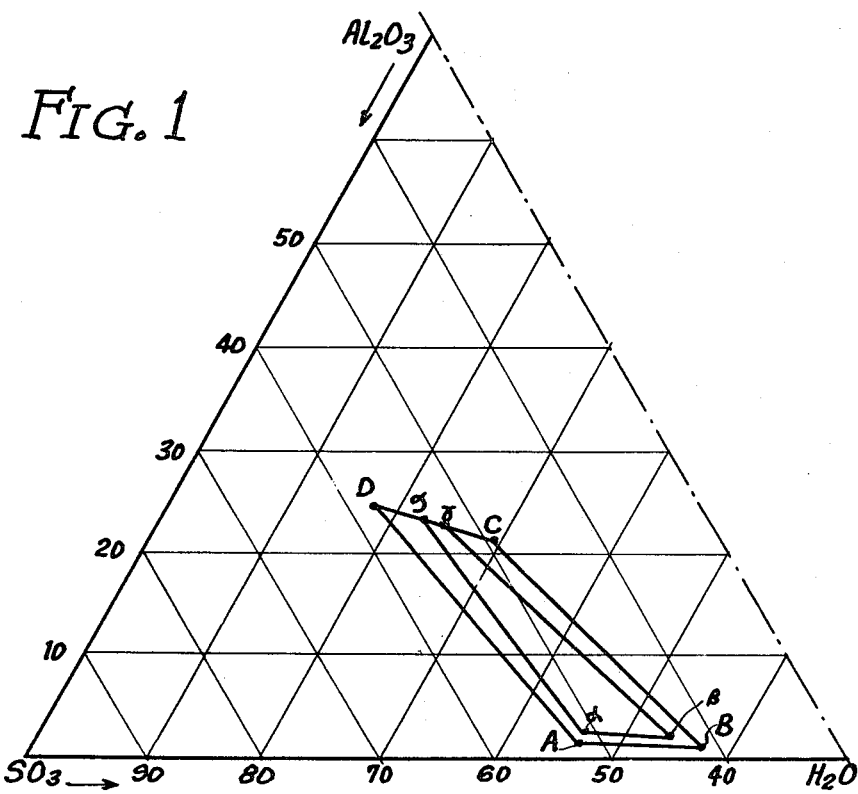
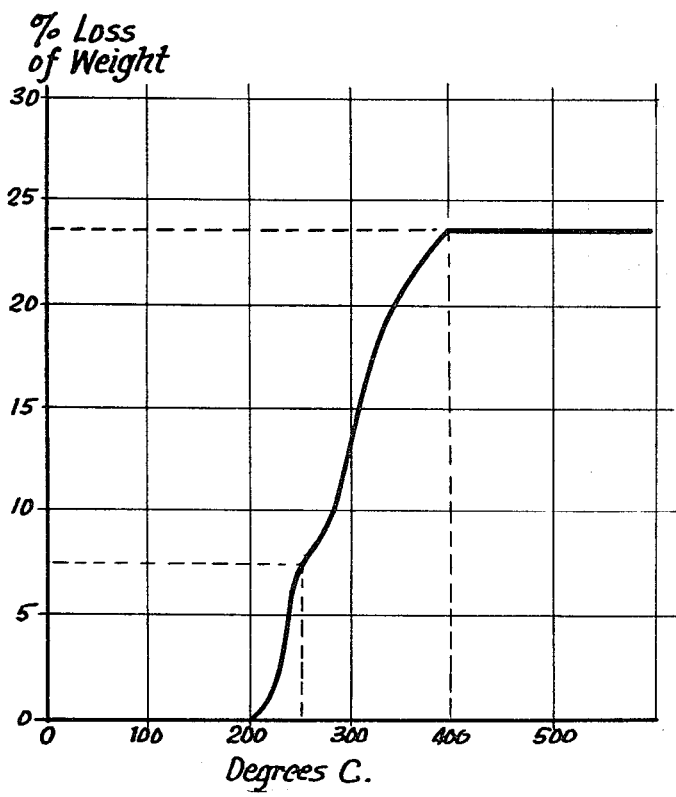
INVENTORS
Maurice A. Jamey
Pierre J. P. Maurel
by Pierre A. Duhart
McDougall, Hersh
and Scott  Attys

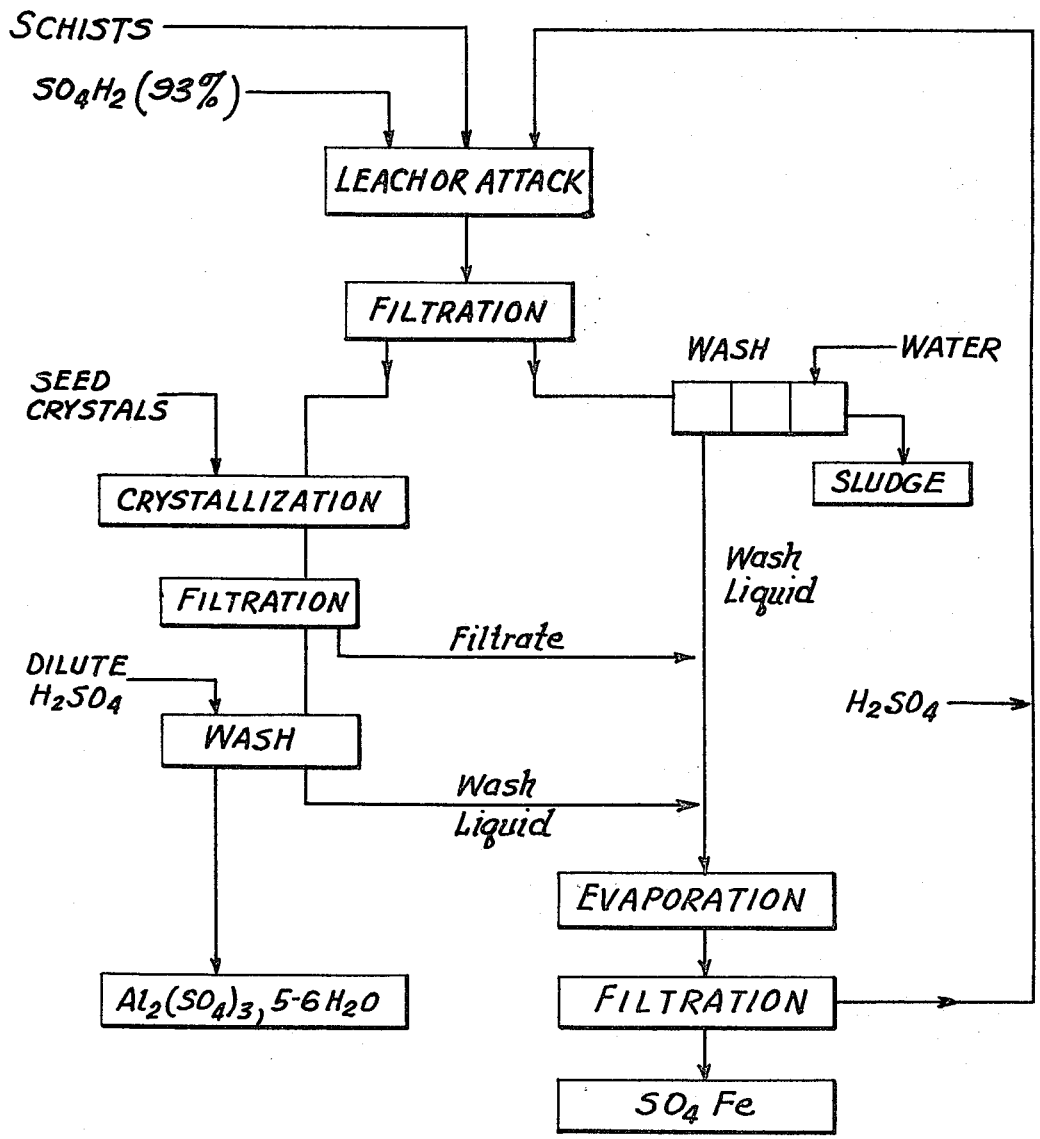

United States Patent Office 3,397,951
Patented Aug. 20, 1968

3,397,951
PROCESS FOR THE PREPARATION OF CRYSTALLIZED NEUTRAL ALUMINUM SULPHATES HAVING LOW WATER CONTENT
Maurice Adrien Jamey, Gardanne, Bouches du Rhone, and Pierre Jean Paul Maurel and Pierre Alexandre Duhart, Aix-en-Provence, Bouches du Rhone, France, assignors to Pechiney, Compagnie de Produits Chimiques et Electrometallurgiques, Paris, France
Filed June 21, 1965, Ser. No. 465,395
Claims priority, application France, June 26, 1964, 979,823
15 Claims. (Cl. 23—123)

ABSTRACT OF THE DISCLOSURE

A process for producing crystallized aluminum sulphate having the formula $Al_2(SO_4)_3$ with 4 to 8 molecules of water of crystallization and in which crystallization is effected from a solution of aluminum sulphate in dilute sulphuric acid at a temperature within the range of 105–140° C. in which the composition of the solution is defined by reference to a quadrilateral within a triangular diagram of the components $SO_3$, $Al_2O_3$, and $H_2O$.

---

This invention relates to neutral hydrated aluminum sulphates having low water content and a high degree of purity and it relates to methods for preparation of same by crystallization from impure solutions of aluminum sulphate in dilute sulphuric acid.

There is a practical application for this process where the sulphate solutions are prepared by the action of sulphuric acid on aluminous ores and materials, such as clays, shales, and other minerals or on secondary products from industrial treatments and from which it is desirable to extract aluminum. After the reaction and separation of insolubles, aqueous solutions are obtained having a high content of alumina and sulphuric acid and which are contaminated by various soluble salts, especially of such metals as iron and alkali metals.

Considerable research has been conducted and numerous patents have been issued on the production of crystals of aluminum sulphate by reaction of such aluminous compounds. Such processes make use of crystallization in response to cooling after the reaction of the sulphuric acid on such aluminous materials and separation of the insolubles. Such procedures result either in the formation of very impure, highly acidic sulphates having a low degree of hydration, such as $Al_2(SO_4)_3 \cdot 3H_2SO_4 \cdot 7H_2O$ (as described in U.S. Patent No. 2,476,979), or acid sulphates having a high degree of hydration such as $$Al_2(SO_4)_3 \cdot H_2SO_4 \cdot 12H_2O$$

(as described in French Patent No. 1,335,816), or neutral sulphates having a high degree of hydration such as $Al_2(SO_4)_3 \cdot 16-18H_2O$ (as described in French Patents No. 1,330,963 and No. 1,330,983).

The highly acidic salts containing impurities must be subjected to a series of purification treatments for the elimination of impurities and excess acid. Such treatments incur high acid losses and involve the use of expensive equipment. The highly acid and neutral salts, containing a high degree of water of crystallization, cannot be transformed into anhydrous neutral sulphates in a simple and economical manner. The highly hydrated salts are dissolved in their water of crystallization when heated to elevated temperature thereby to entail a more complicated installation and a longer period for drying by comparison with an aluminum sulphate having a low water content and which maintains its solid divided state throughout the dehydration period. Further, the amount of heat energy expended is somewhat proportional to the amount of combined water.

Generally speaking, the hydrated aluminum sulphates do not have an important market and it is necessary usually to transform such hydrated aluminum sulphates into their anhydrous state. This operation is essential if it is desirable to make use of such salts in the preparation of alumina by thermal dissociation of the sulphate.

It is an object of this invention to produce and to provide a method for producing neutral aluminum sulphates having a low degree of hydration and it is a related object to provide a method for producing a product of the type described by direct crystalization.

More specifically, it is an object of this invention to produce and to provide a method for producing the salt $Al_2(SO_4)_3 \cdot xH_2O$ in which $x$ is a number between 4 and 8 and in which the described aluminum sulphate is readily reducible under practical and economical conditions to the anhydrous state for use in the production of alumina.

These and other objects and advantages of this invention will hereinafter appear and for purposes of illustration, but not of limitation, reference is made to the accompanying drawings in which—

FIG. 1 is a ternary diagram of the system $Al_2O_3 \cdot SO_3$ and $H_2O$;

FIG. 2 is a chart showing the gravimetric thermal analysis showing the amount of dehydration versus temperature for the aluminum sulphate produced in accordance with the practice of this invention; and FIG. 3 is a flow diagram of the process of this invention.

The ternary diagram of the three constituents, namely—aluminum sulphate, sulphuric acid and water, at different temperatures is poorly known because of the difficulties involved in making their studies. The equilibrium conditions are obtained very slowly because the sulphates tend to remain in a state of supersaturation and the number of acid or neutral salts capable of being crystallized are very numerous, differing one from the other in their chemical compositions and physical appearance. Many have fibrous or pasty textures which make it difficult to isolate such compounds in a purified state for chemical analysis.

We have studied the ternary systems of aluminum sulphate, sulphuric acid and water at temperatures within the range of 60°–160° C. for the purpose of establishing the regions of stability of different types of crystallized neutral or acid aluminum sulphates having different degrees of hydration. It has been found that a fairly restricted region of concentration exists between the temperatures of 105–140° C. for the precipitation of neutral aluminum sulphate having a low degree of hydration corresponding to $Al_2(SO_4)_3 \cdot xH_2O$ in which $x$ is between 4 and 8. This region of concentration can be plotted on a triangular diagram, illustrated in FIG. 1, in which the apices are $SO_3$, $Al_2O_3$ and $H_2O$. The region for the precipitation of neutral aluminum sulphates having a low degree of hydration, as described above, within the temperature range of 105–140° C. is located within the quadrilateral illustrated in the diagram by the letters A, B, C, D, the apices of which have the following coordinates:

A: $SO_3=52.5\%$; $Al_2O_3=1.5\%$; $H_2O=46\%$
B: $SO_3=40.4\%$; $Al_2O_3=1.2\%$; $H_2O=58.4\%$
C: $SO_3=49.5\%$; $Al_2O_3=21\%$; $H_2O=29.5\%$
D: $SO_3=58\%$; $Al_2O_3=24.6\%$; $H_2O=17.4\%$

When the composition of the sulphate in suspension or solution corresponds to a point within the quadrilateral A, B, C, D and when the system is maintained within the range of 105–140° C., a precipitate of aluminum sulphate having the above composition is obtained which can be easily filtered and washed for clean removal. The composition of the crystallized salt will be represented on the graph by a point along its right sequent C, D while the composition of the mother liquor progressively approaches the sequent A, B.

It is possible to prescribe a more restricted and preferred range for the concentration of elements within the areas described above as represented by the quadrilateral $\alpha, \beta, \gamma, \delta$ having the following apices:

$\alpha: SO_3=51.3\%; Al_2O_3=2.4\%; H_2O=46.3\%$
$\beta: SO_3=42.5\%; Al_2O_3=1.8\%; H_2O=55.7\%$
$\gamma: SO_3=53.3\%; Al_2O_3=22.7\%; H_2O=24\%$
$\delta: SO_3=54.5\%; Al_2O_3=23.1\%; H_2O=22.5\%$ When a composition of the solution or suspension falls within the quadrilateral $\alpha, \beta, \gamma, \delta$ and when the solution is maintained within the range of 113–135° C., a substantially perfectly defined aluminum sulphate crystal is obtained having the formula $Al_2(SO_4)_3 \cdot 5.5$–$6H_2O$, a density of 2.27 and an X-ray diagram by Debye-Scherrer spectrum:

| d A. | I/Io | Classification of the lines by order of the relative intensities |
| --- | --- | --- |
| 9.77 | m | 8 |
| 7.25 | f | 12 |
| 6.58 | very F | 2 |
| 6.35 | m F | 6 |
| 5.87 | f | 11 |
| 4.89 | very F | 3 |
| 4.66 | F | 4 |
| 4.625 | F | 5 |
| 3.99 | m | 7 |
| 3.255 | TTF | 1 |
| 2.95 | f | 10 |
| 2.45 | f | 9 | m=medium.
f=low.
F=strong.

As illustrated in the gravimetric thermal analysis of FIG. 2, the loss in weight of the aluminum sulphates prepared in accordance with the practice of this invention is negligible below a temperature of 205° C. There is a slight bend towards 260° C. which corresponds substantially to the composition $Al_2(SO_4)_3 \cdot 4H_2O$. Thereafter dehydration proceeds smoothly to completion at about 400–405° C. The sulphates of this invention remain in a solid state throughout the described dehydration.

The sulphates thus constitute a well defined chemical product which, to the best of our knowledge, has not heretofore been obtained or described.

There has been recognized only one type of sulphate $Al_2(SO_4)_3 \cdot 6H_2O$ having a very low stability and which starts to dehydrate at a temperature of 104° C.

When the solution or suspension has a composition midway between the areas of the preferred range and the broad range, a mixture of sulphates $Al_2(SO_4)_3 \cdot 5.5$–$6H_2O$ are crystallized along with sulphates which have more or less degree of hydration.

Solutions having the indicated composition readily remain in a state of supersaturation even at concentrations considerably above equilibrium. In order to hasten crystallization of the corresponding sulphate, it is desirable to nucleate the crystallization as by the introduction of small seed crystals of the desired sulphate, such as secured from a previous preparation, while at the same time agitating the suspension. Separation of the formed crystals from the mother liquor can be effected cleanly by filtration or by centrifuge without the need to wash the separated crystals. However, a cold water wash will remove mother liquor that remains entrained on the crystals.

The aluminum sulphate crystals obtained in accordance with the practice of this invention have many industrial uses. The crystals are relatively free of insoluble impurities and transportation is less expensive than the more highly hydrated sulphates such as $Al_2(SO_4)_3 \cdot 18H_2O$. The obtained crystals can be readily transformed into anhydrous sulphate merely by heating to a temperature of about 400° C. Since the crystals are not transformed into a liquid during the heating operation, dehydration can be carried out in a hot gaseous stream.

The sulphates, characterized by a low degree of hydration, can be prepared in accordance with the practice of this invention from various starting materials:

(a) It is possible to make use of a neutral or acid aluminum sulphate having any amount of hydration by solution or suspension thereof in a mixture of sulphuric acid and water calculated to provide an overall composition corresponding to a point within the area A, B, C, D or within the area $\alpha, \beta, \gamma, \delta$ of the three phase diagram of FIG. 1. The solution should be maintained at a temperature within the range of 105–140° C. and it should be seeded with small crystals of the desired aluminum sulphate, as from a previous batch.

(b) Instead, use can be made of a sulphate solution formed by the leaching action of sulphuric acid on an aluminous compound such as an aluminum clay or coal shales. After solution and separation of the insoluble gangue materials, as by filtration or centrifuge, a solution of aluminum sulphate in sulphuric acid is secured. The composition of the solution depends somewhat upon the composition of the aluminum raw material and the leaching action of the sulphuric acid. If the resulting solution falls within the boundaries of the quadrilaterals specified in the three phase diagram, crystallization of the desired product can be secured directly by maintenance of the solution at a temperature within the range of 105–140° C., and preferably with seeding. If the solution is outside the boundaries, the composition can be brought within the limits defined either by the removal of water, as by evaporation, or by addition of one or more of the three constituents in amount sufficient to bring the composition to within the boundary limits. Thereafter crystallization of the desired product can be achieved by seeding with the sulphate crystals and agitation while maintaining the system at a temperature within the range of 105–140° C.

The mother liquor remaining after separation of the aluminum sulphate crystals will contain sulphuric acid, aluminum sulphate and impurities such as iron, sodium, potassium, calcium and the like. The mother liquor and/or the wash water containing mother liquor removed from the separated crystals can be recycled with the addition of concentrated sulphuric acid to make up the solution to the desired concentration for treatment of the aluminous raw material.

The means for elimination of undesirable impurities from the recycled mother liquor and wash water will depend somewhat upon the composition of the aluminous compound and the content of soluble materials other than alumina. In the commercial practice of this invention wherein use is made of coal shales or schists, purification for removal of impurities is greatly simplified since the major portions of the impurities are eliminated with the compounds insoluble in sulphuric acid and such impurities therefore do not accumulate in the mother liquor despite repeated recycling. Certain of these compounds, particularly iron, can be recovered by washing the residual sludges.

Anhydrous aluminum sulphate, such as may be obtained by dehydration of the crystals formed by the practice of this invention, can be transformed into alumina by thermal dissociation in accordance with well known processes with the recovery of sulphuric acid.

The following example, which is addressed to the preparation of neutral sulphates from coal shales or schists, is intended to represent commercial practice of the invention including the steps of solution, separation of residue, crystallization of product and recycling of reagents. The example is given by way of illustration and not by way of limitation, it being understood that the sulphate crystals can be prepared from solutions obtained by other procedures.

EXAMPLE

The flow diagram for the production of aluminum sulphate from coal schists is illustrated in FIG. 3. The schist serving as raw material is part of the material rejected at the time of extracting coal from a coal mine in the northern part of France and the following is an analysis of the chemical composition thereof:

aluminum content, calculated as $Al_2O_3$, is 20.5%.
iron content, calculated as $Fe_2O_3$, is 6.3%.
silicon content, calculated as $SiO_2$, is 55%.
sodium content, calculated as $Na_2O$, is 1%.
potassium content, calculated as $K_2O$, is 4%.
alkaline-earth metals, calculated as CaO, is 1%.

In addition, it contains 4–5% carbon and traces of many other metals. The schist is used in the crude state after crushing to particle size of 0.1 to 1 mm. The raw material is leached with sulphuric acid solutions recycled from a previous operation and to which there has been added an amount of concentrated sulphuric acid to compensate for the losses and for the acid which is transformed into the aluminum sulphate.

To 365 kg. of crushed schist containing 75 kg. of alumina $Al_2O_3$ and 23 kg. of iron oxide, calculated as $Fe_2O_3$, there are added 1500 liters of recycled acid containing 50 g./liter of $Al_2O_3$, 16 g./liter of FeO and 770 g./liter of salt-free $H_2SO_4$ and to which there is added 74 liters of pure sulphuric acid (93% $H_2SO_4$).

The acid attack is initiated at the boiling temperature (146° C.) of the acid mixture and falls progressively to 141° C. The leaching action lasts for about three hours after which the suspension is filtered. There are obtained 1250 liters of a clear liquid phase and a sludge formed of the solid phase wet with residual attacking liquid. This sludge contains all of the silica originally present in the schist and the major part of the iron which is primarily in the ferrous state, probably because of reduction during the attack or leaching action. It contains a certain quantity of aluminum sulphate dissolved in the liquid. The sludge is subjected to a water wash in counter-current flow and then filtered. The solids, formed mainly of silica, are rejected and the liquid phase, which contains aluminum sulphate corresponding to 29 kg. of $Al_2O_3$ and 34 kg. of FeO in the form of ferrous sulphate, are forwarded to an evaporator.

The 1250 liters of filtrate obtained after the leaching attack contains aluminum sulphate corresponding to 112.5 kg. of $Al_2O_3$ and ferrous sulphate corresponding to 11.3 kg. of FeO. The density of the solution is 1.64. Its content of free $H_2SO_4$ is 675 g./liter and its content of alumina ($Al_2O_3$) is 90 g./liter. The composition by weight of the mixture corresponds to 46.5% $SO_3$, 5.5% $Al_2O_3$ and 48% $H_2O$. The representative point on the diagram is within the quadrilateral $\alpha \beta \gamma \delta$. This solution is maintained at a temperature of 133° C. and is seeded with 30 kg. of aluminum sulphate $Al_2(SO_4)_3 \cdot 5.5$–$6H_2O$, obtained from a previous operation. The mixture is stirred for 5 to 10 hours in order to insure equilibrium of the system and then the crystals that are formed are separated by filtration. The crystals are washed in counter-current flow with 250 liters of a dilute solution of sulphuric acid which is added to the filtrate. The mixture of filtrate and the wash acid adds up to 1250 liters and contains 47 kg. of alumina $Al_2O_3$, 10.8 kg. of FeO in the form of $FeSO_4$, and 960 kg of sulphuric acid $H_2SO_4$.

This solution is forwarded with the washing liquors from the sludges to an evaporator for concentration at 141° C. and the liquid volume has been reduced to 1500 liters. Upon cooling, precipitation of 110 kg. of ferrous sulphate takes place corresponding to 28.5 kg, of FeO which is recovered by filtration. The filtrate, which contains 75 kg. of $Al_2O_3$ in the form of a sulphate, 24.3 kg. of FeO in the form of ferrous sulphate, and 1160 kg. of free sulphuric acid is recycled to the system for use in attacking or leaching the raw material.

318 kg. of aluminum sulphate crystals are obtained having the composition $Al_2(SO_3)_4 \cdot 5.5$–$6H_2O$ containing the equivalent of 720 kg. of alumina $Al_2O_3$, and ferrous sulphate corresponding to 0.45 kg. of FeO.

It will be apparent that 78% of the alumina originally contained in the schist has been transformed into the neutral sulphate having a low degree of hydration and containing only a very small amount of iron. It is possible to eliminate the iron substantially completely by re-crystallization of the aluminum sulphate under the conditions as described above regarding temperature and concentration of sulphate, acid and water, characteristic of the present invention.

It will be apparent from the foregoing that we have provided a simple and efficient means for the production of neutral aluminum sulphates having a low degree of hydration and which are capable of dehydration in a simple and efficient manner.

It will be understood that changes may be made in the details of formulation and operation without departing from the spirit of the invention, especially as defined in the following claims.

We claim:

1. The process for production of crystallized aluminum sulphate having the formula $Al_2(SO_4)_3 \cdot xH_2O$ in which $x$ is a number from 4 to 8, comprising the steps of maintaining a solution of aluminum sulphate in dilute sulphuric acid at a temperature within the range of 105–140° C. in which the solution has a composition which falls within the quadrilateral drawn in a triangular diagram of the compounds $SO_3$, $Al_2O_3$ and $H_2O$, in which the apices of the quadrilateral diagram A, B, C, D correspond to the following and in which the percentages are percent by weight:

A: $SO_3=52.5\%$; $Al_2O_3=1.5\%$; $H_2O=46\%$
B: $SO_3=40.4\%$; $Al_2O_3=1.2\%$; $H_2O=58.4\%$
C: $SO_3=49.5\%$; $Al_2O_3=21\%$; $H_2O=29.5\%$
D: $SO_3=58\%$; $Al_2O_3=24.6\%$; $H_2O=17.4\%$ and separating the crystals that are formed from the mother liquor.

2. The process as claimed in claim 1 in which the solution of aluminum sulphate in dilute sulphuric acid is formed by dissolving aluminum sulphate having any degree of hydration in sulphuric acid and adjusting the ingredients to a composition within the quadrilateral diagram by one of the steps of removal of water by evaporation, addition of sulphuric acid, and addition of aluminum sulphate.

3. The process as claimed in claim 1 in which the solution of aluminum sulphate in dilute sulphuric acid is formed by leaching an aluminous ore with sulphuric acid.

4. The process as claimed in claim 1 which includes the step of seeding the solution with crystals of the aluminum sulphate to be formed.

5. The process as claimed in claim 1 which includes the step of agitating the solution while being maintained at the desired temperature to accelerate crystal formation.

6. The process as claimed in claim 1 which includes the step of washing the separated crystals with dilute sulphuric acid.

7. The process as claimed in claim 3 in which the sulphuric acid used to leach the aluminous ore is recycled from the mother liquor separated from the crystals in the solution.

8. The process as claimed in claim 1 which includes the step of drying the separated crystals in a current of hot gas having a temperature above 205° C. for dehydration of the aluminum sulphate to form anhydrous aluminum sulphate.

9. The process for the production of crystallized aluminum sulphate having the formula $Al_2(SO_4)_3 \cdot 5.5-6H_2O$ comprising forming a solution of aluminum sulphate having a composition falling within a quadrilateral formed on a triangular diagram of the components $SO_3$, $Al_2O_3$ and $H_2O$, in which the apices A, B, C, D of the quadrilateral correspond to the following compositions in percent by weight:

A: $SO_3=51.3\%$; $Al_2O_3=2.4\%$; $H_2O=46.3\%$
B: $SO_3=42.5\%$; $Al_2O_3=1.8\%$; $H_2O=55.7\%$
C: $SO_3=53.3\%$; $Al_2O_3=22.7\%$; $H_2O=24\%$
D: $SO_3=54.4\%$; $Al_2O_3=23.1\%$; $H_2O=22.5\%$ maintaining the solution at a temperature between 113–135° C. to crystallize the aluminum sulphate, and then separating the crystallized aluminum sulphate from the mother liquor.

10. The process as claimed in claim 9 in which the solution of aluminum sulphate in sulphuric acid is formed by dissolving aluminum sulphate having any degree of hydration in sulphuric acid and adjusting the ingredients to a composition within the quadrilateral diagram by one of the steps of removing water, adding sulphuric acid, and adding aluminum sulphate.

11. The process as claimed in claim 9 in which the solution of aluminum sulphate in sulphuric acid is formed by leaching an aluminous ore with sulphuric acid.

12. The process as claimed in claim 9 which includes the step of adding seed crystals to the solution of the aluminum sulphate to accelerate crystal formation.

13. The process as claimed in claim 9 which includes the steps of adding seed crystals of aluminum sulphate of the composition desired to be crystallized and agitating the liquid system to accelerate the formation of crystals.

14. The process as claimed in claim 9 which includes the step of washing the separated crystals with dilute sulphuric acid.

15. The process as claimed in claim 11 which includes recycling the mother liquor separated from the crystals for use in leaching the aluminous ore.

References Cited

UNITED STATES PATENTS 3,330,622  7/1967  Saeman _____ 23—123

EDWARD J. MEROS, *Primary Examiner.*

G. PETERS, *Assistant Examiner.*